Dec. 1, 1970 R. K. DATTA 3,544,479
LITHIUM VANADIUM GARNET PHOSPHORS
Filed Dec. 28, 1967 2 Sheets-Sheet 1

RELATIVE EMISSION VS WAVELENGTH
$Ca_3Li_{1+\frac{x}{2}}Mg_{1-x}Eu_{\frac{x}{2}}V_3O_{12}$
(2537Å EXCITATION)

DIFFUSE REFLECTANCE VS WAVELENGTH

Inventor:
Ranajit K. Datta
by Richard H. Burgess
His Attorney

TEMPERATURE–BRIGHTNESS CURVE

United States Patent Office 3,544,479
Patented Dec. 1, 1970

---

3,544,479
LITHIUM VANADIUM GARNET PHOSPHORS
Ranajit K. Datta, East Cleveland, Ohio, assignor to General Electric Company, a corporation of New York
Filed Dec. 28, 1967, Ser. No. 694,185
Int. Cl. C09k 1/44
U.S. Cl. 252—301.6     8 Claims

ABSTRACT OF THE DISCLOSURE

Lithium vanadium garnets of the general formula $Ca_2LiE_2V_3O_{12}$ ($E=Ca^{+2}, Mg^{+2}, Zn^{+2}$) were activated with various trivalent ions while maintaining the charge balance. These materials show a broad blue emission under cathode rays and long- and short-wavelength ultraviolet radiations and can be used in lamps or cathode ray tubes. Such $Eu^{+3}$-activated vanadium garnets show red emission under short- and long-wavelength ultraviolet radiations, and in the former case the brightness is about 65% of that of commercial $YVO_4$:Eu. In the case of coupled substitution of $Eu^{+3}+Z^{+4}$ ($Z=Si^{+4}, Ge^{+4}$) for $V^{+5}+Mg^{+2}$, an improved brightness-temperature relationship is obtained.

BACKGROUND OF THE INVENTION

This invention relates to luminescent materials which convert short- and long-wavelength ultraviolet radiations, cathode rays and X-rays into visible radiations.

Sodium vanadium garnets activated with trivalent europium are described by Blasse and Bril in "Fluorescence of $Eu^{3+}$-Activated Garnets Containing Pentavalent Vanadium," J. Electrochem. Soc., 114, 250 (March 1967).

Several garnets without activators and having the general formula $Ca_3AEV_3O_{12}$ where A is Li or Na and E is Co, Ni, Mg or Zn are described by Bayer in J. Amer. Ceram. Soc., 48, 600 (1965).

The brightness of sodium vanadium garnets generally is insufficient for many applications. Also, disclosures of unactivated compounds generally teach little of how to produce superior phosphors by altering the structure or composition of the compounds.

SUMMARY OF THE INVENTION

It is an object of the invention to provide luminescent materials or phosphors, the emission color of which can be varied by varying the activator concentration and the temperature of the sample. A further object is to provide certain phosphors having stability of brightness with increased temperature satisfactory for use in certain high temperature lamp applications.

Briefly stated, the present invention in certain of its embodiments provides luminescent materials according to the general formula:

$$Ca_2A_{1+\frac{x}{2}} E_{2-x-\frac{y}{2}} R_{\frac{x+y}{2}} H_{3-\frac{y}{2}} Z_{\frac{y}{2}} O_{12}$$

wherein A is

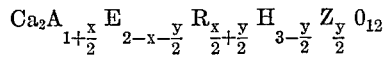

with $a$ from 0 to about 0.50,
E is at least one of $Ca^{+2}$, $Mg^{+2}$, and $Zn^{+2}$,
R is at least one of $Bi^{+3}$, $Eu^{+3}$, $Sm^{+3}$, $Dy^{+3}$ and $Er^{+3}$, and includes from 0 to about 6 atom percent $Tb^{+3}$ and $Ho^{+3}$,

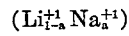

with $b$ from 0 to about 0.05, and
Z is

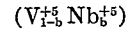

with $c$ from 0 to 1, and when $x>0$, $y=0$ and $x$ is from a small but effective amount up to 0.3, and
when $y>0$, $x=0$ and $y$ is from a small but effective amount up to 0.3.

In one preferred embodiment, when $y$ is 0, $R^{+3}+Li^+$ are substituted for $2E^{+2}$. This maintains charge balance by replacing two divalent atoms with a trivalent atom and a monovalent atom. The number of cations per unit formula is also unchanged to avoid lattice vacancies. The preferred range for $x$ is about from 0.1 to 0.24. The general formula for such phosphors is

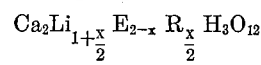

In certain preferred embodiments, E is a mixture of $Mg^{+2}$ and $Zn^{+2}$, or $Mg^{+2}$ alone, or $Zn^{+2}$ alone and R is $Eu^{+3}$.

Another preferred embodiment of the invention is achieved when $x$ is 0, and $R^{+3}+Z^{+4}$ are substituted for $H^{+5}+E^{+2}$. This maintains charge balance by substituting a total of seven positive charges for another seven positive charges. The preferred range for $y$ is about from 0.1 to 0.24. The general formula for such phosphors is

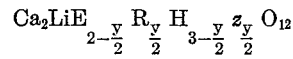

In certain preferred embodiments, E is $(Mg^{+2}+Zn^{+2})$, $Mg^{+2}$, or $Zn^{+2}$, R is $Eu^{+3}$, and Z is $Si^{+4}$; and, in another form, E is $(Mg^{+2}+Zn^{+2})$, $Mg^{+2}$, or $Zn^{+2}$, R is $Eu^{+3}$, and Z is $Ge^{+4}$.

Either method of substitution produces good phosphors, but the double substitution of the immediately preceding paragraph results in reduced brightness under 3650 angstrom units (A.) excitation and superior maintenance of brightness at elevated temperatures unde both 2537 and 3650 A. excitations.

DESCRIPTION OF THE PREFERRED EMBODIMENTS

Figure 1:
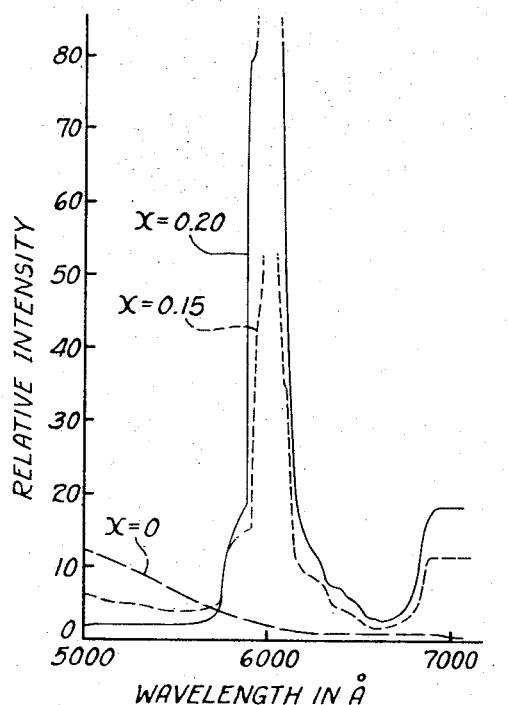
FIG. 1 is a graph of relative intensity versus wavelength for phosphors of the invention having varying proportions of europium activator, and shows an increase in the europium emission in the region of 5900 to 7160 A., with a very strong maximum at 6100 A., along with suppression of the matrix emission with increasing europium content.

The unactivated lithium vanadium garnet matrix, when excited by 2537 or 3650 A. excitation, has a broad emission band extending from 4200 to 5200 A. with a peak at 4700 A. Incorporation of $Eu^{+3}$ introduces a major fluorescent peak in the red region under cathode rays, 2537 and 3650 A. excitation. $Eu^{+3}$-activated $Ca_2LiE_2H_3O_{12}$ emits a narrow-band spectrum in the region of 5900 to 7160 A., with a very strong maximum at 6100 A. Increasing the $Eu^{+3}$ content increases the $Eu^{+3}$ emission and decreases the matrix emission, as seen in FIG. 1. The nature of the emission spectrum of $Eu^{+3}$-activated $Ca_2LiE_2H_3O_{12}$ is the same whether the $Eu^{+3}$ is substituted with $A^{+1}$ or $2E^{+2}$, or is substituted with $Z^{+4}$ for $H^{+5}+E^{+2}$ in the above-stated formulae.

The intensity of the 6100 A. peak of $$Ca_3Li_{1.2}Mg_{0.6}Eu_{0.2}V_3O_{12}$$

is about 30% of that of standard commercial $$Y_{0.95}Eu_{0.05}VO_4$$

phosphor, although the total brightness measured through an eye sensitivity filter is about 65% of the commercial $YVO_4$:Eu phosphor under 2537 A. excitation.

Figure 2:
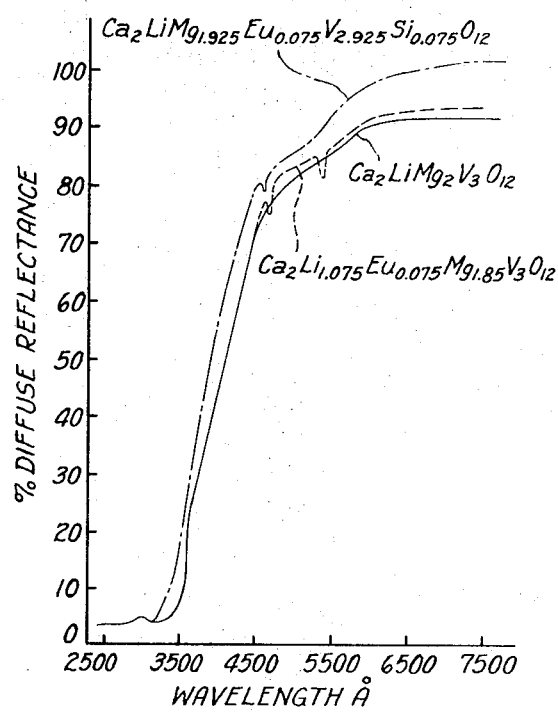
FIG. 2 is a graph showing the percent diffuse reflectance versus wavelength for three phosphors of the invention, showing desirable increase of diffuse reflectance (in the visible region) caused by activation, relative to the unactivated matrix.

The unactivated garnet $Ca_2LiMg_2V_3O_{12}$ shows about 90% diffuse reflectance in the visible region. However, when a coupled substitution of $Eu^{+3}$ with $Si^{+4}$ or $Ge^{+4}$ is made for $E^{+2}+V^{+5}$, the diffuse reflectance in the visible region is increased, as shown in FIG. 2.

The trivalent europium-activated lithium vanadium garnets of the invention become more red under 2537 and 3650 A. excitations when the temperature of the sample is increased. The broad blue lattice emission of the matrix becomes insignificant at about 60° C., leaving the $Eu^{+3}$-red emission to predominate under 2537 and 3650 A. excitation.

Figure 3:
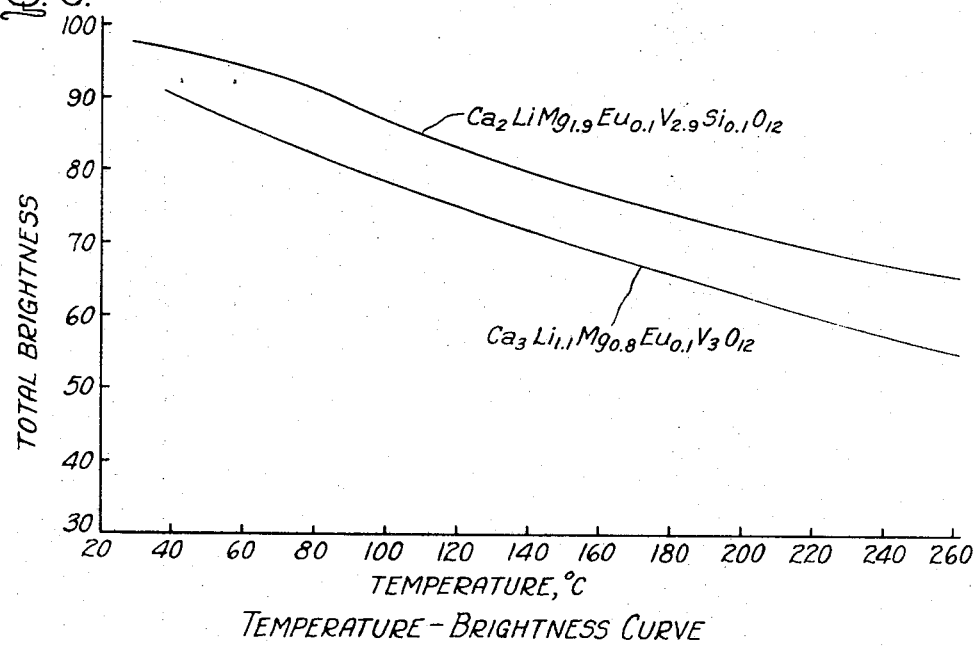
FIG. 3 is a temperature-brightness graph showing the response to elevated temperature of two phosphors of the invention under 2537 A. excitation.

The temperature-brightness curve of $$Ca_3Li_{1.1}Mg_{0.8}Eu_{0.1}V_3O_{12}$$

is shown in FIG. 3 along with a similar curve for $$Ca_2LiMg_{1.9}Eu_{0.1}V_{2.9}Si_{0.1}O_{12}$$

Substitution of $Eu^{+3}$ and $Si^{+4}$ or $Ge^{+4}$ for $V^{+5}+Mg^{+2}$ improves the temperature-brightness relationship, as shown in FIG. 3 for the silicon-containing phosphor which has a brightness at 260° C. about 65% of the room temperature brightness.

Figure 4:
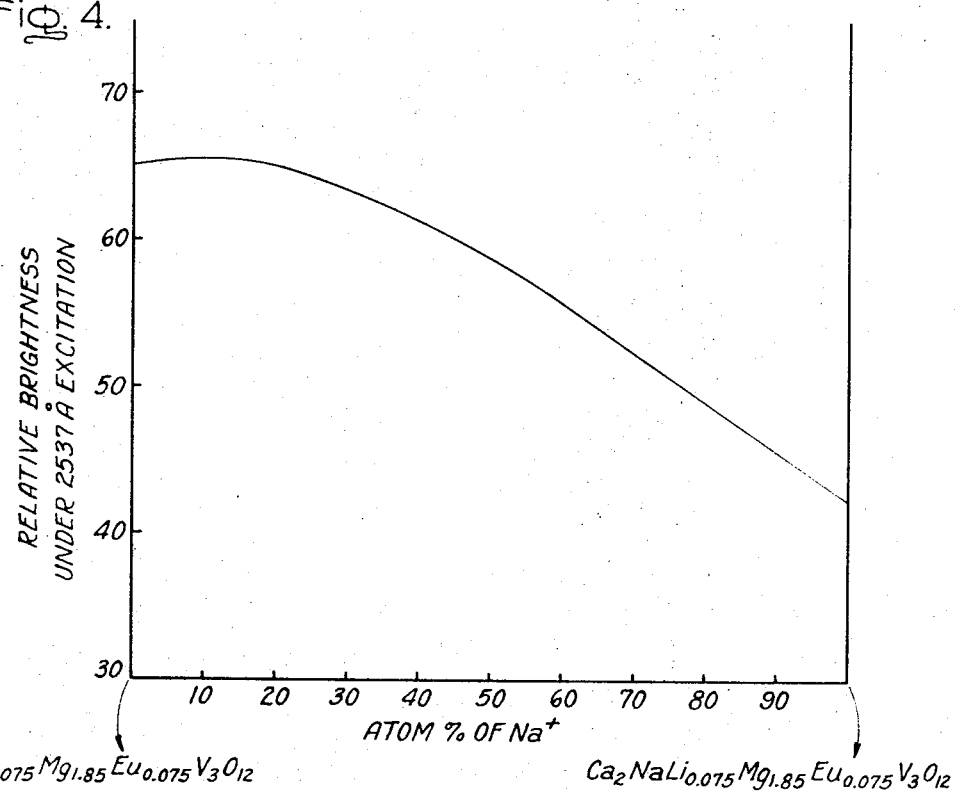
FIG. 4 is a graph illustrating the substantial fall-off of brightness of lithium vanadium garnet phosphors in which sodium is substituted for more than half of the lithium atoms.

FIG. 4 shows the relative brightness with 2537 A. excitation versus atom percent of sodium replacing the basic quantity of lithium in the formula of $$Ca_2Li_{1.075}Mg_{1.85}Eu_{0.075}V_3O_{12}$$

Since 0.075 atoms of the lithium in this formula are added to compensate for the excess ionic charge of the 0.075 $Eu^{+3}$ substituted for $Mg^{+2}$, the basic amount of lithium in the formula can be considered to be just one atom. Because of the ionic size relationships involved, sodium cannot be substituted for these 0.075 atoms of lithium for charge compensation. Thus, even when sodium has substituted for all of the basic quantity of lithium in the lattice, 0.075 atoms of lithium remain. The curve shows a major difference in brightness between the lithium phosphor and the sodium phosphor. With up to about 30% sodium substituted for the basic amount of lithium, brightness is relatively constant. Even with 50% sodium substituted for the lithium content, the brightness still demonstrates more than half of the improvement obtained going from the sodium phosphor to the lithium phosphor. Thus, applicant's invention can be considered to include up to 50 atomic percent substitution of sodium for the lithium in the phosphor.

Brightnesses of several phosphors of the invention in response to 2537 and 3650 A. excitation are presented in Table I, measured relative to a commercial $YVO_4$:Eu phosphor. The entries in the table can be divided into three groups, each showing increased brightness with increased europium concentration. The first group has simple europium substitution in the magnesium-bearing phosphor with lithium compensation. The second group has simple europium substitution in the zinc-bearing phosphor with lithium compensation. The third group has europium substitution for magnesium with compensation by vanadium and silicon in one case and vanadium and germanium in the other case. Generally, brightness is increased as europium concentration is increased, except that the germanium-bearing phosphor is less sensitive to excitation by 3650 A. radiation and more sensitive to excitation by 2537 A. radiation.

TABLE I

[Brightness of $Eu^{+3}$-activated lithium vanadium garnet]

| Composition | Relative brightness | |
|---|---|---|
| | 2,537 A. excitation | 3,650 A. excitation |
| $Ca_3Li_{1.025}Mg_{0.95}Eu_{0.025}V_3O_{12}$ | 47 | 40 |
| $Ca_3Li_{1.075}Mg_{0.85}Eu_{0.075}V_3O_{12}$ | 58 | 48 |
| $Ca_3Li_{1.10}Mg_{0.8}Eu_{0.10}V_3O_{12}$ | 63 | 50 |
| $Ca_3Li_{1.2}Mg_{0.6}Eu_{0.2}V_3O_{12}$ | 65 | 51 |
| $Ca_3Li_{1.075}Zn_{0.85}Eu_{0.075}V_3O_{12}$ | 59 | 48 |
| $Ca_3Li_{1.2}Zn_{0.6}Eu_{0.2}V_3O_{12}$ | 65 | 50 |
| $Ca_2LiMg_{1.95}Eu_{0.05}V_{2.95}Si_{0.05}O_{12}$ | 60 | 33 |
| $Ca_2LiMg_{1.90}Eu_{0.1}V_{2.9}Ge_{0.1}O_{12}$ | 68 | 30 |

Examples are given below of preparation of several types of phosphors of the invention, as indicated, to illustrate typical preferred techniques. Brightnesses are given for the phosphor of each example with 2537 A. excitation relative to commercial $YVO_4$:Eu phosphors, except where otherwise stated.

EXAMPLE I $$Ca_3Li_{1.005}Eu_{0.005}Mg_{0.99}V_3O_{12}$$

A batch of:

| | Gm. |
|---|---|
| $CaCO_3$ | 9.01 |
| $Li_2CO_3$ | 1.11 |
| Basic $MgCO_3$ | 2.81 |
| $V_2O_5$ | 8.19 |
| $Eu_2O_3$ | 0.026 | was mixed together and fired at 700° C. in a silica crucible for 1½ hours in air. The basic $MgCO_3$ used in this application has 42.67% MgO by weight. The cooled sample was ground and refired at 800° C. for one hour in an air atmosphere. The phosphor was then crushed, washed with dilute (5–7%) ammonia solution at 80–90° C. for about 45 minutes, filtered and dried. The final product was a white powder which on excitation under cathode rays or ultraviolet radiations showed a broad emission spectrum extending from 4200–5200 A. and superimposed with the narrow-band $Eu^{+3}$ emission peaks with a maximum at 6100 A. The relative brightness was 33%.

EXAMPLE II $$Ca_3Li_{1.05}Zn_{0.90}Eu_{0.05}V_3O_{12}$$

| | Gm. |
|---|---|
| $CaCO_3$ | 9.01 |
| $V_2O_5$ | 8.19 |
| $Li_2CO_3$ | 1.16 |
| ZnO | 2.20 |
| $Eu_2O_3$ | 0.264 | were mixed together thoroughly under acetone, dried and fired in a silica crucible at 700° C. for 1½ hours. The sample was then cooled, ground and refired at 800° C. for 1 hour. The phosphor was washed with dilute (5–7%) ammonia solution at 80–90° C. for about 45 minutes to remove any excess, unreacted films of $V_2O_5$. The sample was filtered and dried. The final product was a white powder having the above composition. The sample when excited by cathode rays, 2537 or 3650 A. radiation, showed good red emission. Its relative brightness was 55%.

EXAMPLE III $$Ca_3Li_{1.05}Mg_{0.90}Sm_{0.05}V_3O_{12}$$

To demonstrate the activation of $Ca_3LiMgV_3O_{12}$ with $Sm^{+3}$,

| | Gm. |
|---|---|
| $CaCO_3$ | 4.50 |
| Basic $MgCO_3$ | 1.27 |
| $Li_2CO_3$ | 0.584 |
| $V_2O_5$ | 4.09 |
| $Sm_2O_3$ | 0.130 | were mixed together and treated as described in Example I. The final product was a white powder which showed pale pink emission under cathode rays and ultraviolet excitations. Its relative brightness was 42%.

EXAMPLE IV $Ca_3Li_{1.05}Zn_{0.90}Dy_{0.05}V_3O_{12}$

To demonstrate the activation of $Ca_3LiZnV_3O_{12}$ with $Dy^{+3}$,

|  | Gm. |
|---|---|
| $CaCO_3$ | 2.25 |
| $Li_2CO_3$ | 0.290 |
| ZnO | 0.55 |
| $V_2O_5$ | 2.088 |
| $Dy_2O_3$ | 0.0699 | were mixed together and treated as described in Example I. The sample showed yellow emission under cathode rays, 2537 and 3650 A. excitations, and had a relative brightness of 38% of $Y_{0.95}Dy_{0.05}VO_4$.

EXAMPLE V $Ca_3Li_{1.085}Eu_{0.075}Bi_{0.01}Zn_{0.83}V_3O_{12}$

To demonstrate the coactivation of $Ca_3LiZnV_3O_{12}$ by $Eu^{+3}$ and $Bi^{+3}$,

|  | Gm. |
|---|---|
| $CaCO_3$ | 4.504 |
| ZnO | 1.013 |
| $Li_2CO_3$ | 0.601 |
| $V_2O_5$ | 4.175 |
| $Eu_2O_3$ | 0.198 |
| $Bi_2O_3$ | 0.0346 | were mixed together and treated as in Example I. The phosphor showed red emission under ultraviolet excitation, although the brightness was about 2% lower than the corresponding phosphor without any $Bi^{+3}$. It had a relative emission of 57%.

EXAMPLE VI $Ca_3Li_{1.15}Mg_{0.70}Eu_{0.15}V_{2.99}Nb_{0.01}O_{12}$

To demonstrate substitution of $Nb^{+5}$ for $V^{+5}$,

|  | Gm. |
|---|---|
| $CaCO_3$ | 4.504 |
| Basic $MgCO_3$ | 0.992 |
| $V_2O_5$ | 4.132 |
| $Nb_2O_5$ | 0.0598 |
| $Li_2CO_3$ | 0.637 |
| $Eu_2O_3$ | 0.396 | were mixed together and treated as in Example I. The phosphor was free-flowing, dense, much less sintered than without the $Nb^{+5}$, and showed red emission under cathode rays and ultraviolet excitations. Its relative brightness was 62%.

EXAMPLE VII $Ca_3LiMg_{0.9}Eu_{0.1}V_{2.9}Si_{0.1}O_{12}$

To demonstrate double substitution of $Eu^{+3}$ and $Si^{+4}$ for $Mg^{+2}$ and $V^{+5}$,

|  | Gm. |
|---|---|
| $CaCO_3$ | 3.003 |
| Basic $MgCO_3$ | 0.851 |
| $V_2O_5$ | 2.689 |
| $Li_2CO_3$ | 0.369 |
| $SiO_2$ | 0.0606 |
| $Eu_2O_3$ | 0.176 | were mixed and treated as in Example I. The phosphor showed brighter diffuse reflectance in the visible region and better light temperature brightness than the corresponding phosphor without $Si^{+4}$ and had a relative brightness of 67%.

EXAMPLE VIII $Ca_3LiMg_{0.9}Eu_{0.1}V_{2.0}Ge_{0.1}O_{12}$

To demonstrate substitutions of $Eu^{+3}$ and $Ge^{+4}$ for $Mg^{+2}$ and $V^{+5}$,

|  | Gm. |
|---|---|
| $CaCO_3$ | 3.003 |
| $V_2O_5$ | 2.689 |
| Basic $MgCO_3$ | 0.851 |
| $Li_2CO_3$ | 0.369 |
| $GeO_2$ | 0.015 |
| $Eu_2O_3$ | 0.176 | were mixed together and treated as in Example I. This phosphor was coarse grained and highly sintered; it showed red emission under ultraviolet excitation and had a relative brightness of 68%.

The foregoing is a description of illustrative embodiments of the invention, and it is applicant's intention in the appended claims to cover all forms which fall within the scope of the invention.

What I claim as new and desire to secure by Letters Patent of the United States is:

1. Lithium vanadium garnet luminescent material according to the general formula:

$$Ca_2A_{1+\frac{x}{2}}E_{2-x-\frac{y}{2}}R_{\frac{x}{2}+\frac{y}{2}}H_{3-\frac{y}{2}}Z_{\frac{y}{2}}O_{12}$$

wherein A is $$(Li^{+1}_{1-a} Na^{+1}_a)$$

with $a$ from 0 to about 0.50,
E is at least one of $Ca^{+2}$, $Mg^{+2}$, and $Zn^{+2}$,
R is at least one of $Bi^{+3}$, $Eu^{+3}$, $Sm^{+3}$, $Dy^{+3}$, and $Er^{+3}$, and includes from 0 to about 6 atom percent $Tb^{+3}$ and $Ho^{+3}$,
H is $$(V^{+5}_{1-b} Nb^{+5}_b)$$

with $b$ from 0 to about 0.05, and
Z is $$(Si^{+4}_{1-c} Ge^{+4}_c)$$

with $c$ from 0 to 1, and when $x>0$, $y=0$ and $x$ is from a small but effective amount sufficient to produce luminescence up to 0.3, and
when $y>0$, $x=0$ and $y$ is from a small but effective amount sufficient to produce luminescence up to 0.3.

2. Luminescent material according to claim 1 and according to the general formula:

$$Ca_2Li_{1+\frac{x}{2}}E_{2-x}R_{\frac{x}{2}}H_3O_{12}$$

wherein $x$ is about from 0.1 to 0.24.

3. Luminescent material according to claim 2 in which E is at least one of $Mg^{+2}$ and $Zn^{+2}$ and R is $Eu^{+3}$.

4. Luminescent material according to claim 2 wherein E is $Mg^{+2}$ and R is $Eu^{+3}$.

5. Luminescent material according to claim 2 wherein E is $Zn^{+2}$ and R is $Eu^{+3}$.

6. Luminescent material according to claim 1 and according to the general formula:

$$Ca_2LiE_{2-\frac{y}{2}}R_{\frac{y}{2}}H_{3-\frac{y}{2}}Z_{\frac{y}{2}}O_{12}$$

wherein $y$ is about from 0.1 to 0.24.

7. Luminescent material according to claim 6 wherein E is $Mg^{+2}$, R is $Eu^{+3}$, and Z is $Si^{+4}$.

8. Luminescent material according to claim 6 wherein E is $Mg^{+2}$, R is $Eu^{+3}$, and Z is $Ge^{+4}$.

(References on following page)

References Cited

Bayer—Vanadates $A_3B_2V_3O_{12}$ with Garnet Structure—J. Amer. Ceram. Soc., vol. 48 p. 600, 1965.

Blasse et al., Fluorescence of $Eu^{3+}$-Activated Garnets Containing Pentavalent Vanadium—J. Electrochem. Soc., vol. 114, pp. 250–251 March 1967.

TOBIAS E. LEVOW, Primary Examiner

R. D. EDMONDS, Assistant Examiner

U.S. Cl. X.R.

252—301.4